Aug. 25, 1953   J. M. SLATER ET AL   2,649,808
GYROSCOPE

Filed Jan. 24, 1949   2 Sheets-Sheet 1

INVENTORS.
JOHN M. SLATER
ROBERT M. BENSON
DARWIN L. FREEBAIRN

BY *William R. Lane*
ATTORNEY

Patented Aug. 25, 1953

2,649,808

UNITED STATES PATENT OFFICE 2,649,808

GYROSCOPE

John M. Slater, Inglewood, Robert M. Benson, Buena Park, and Darwin L. Freebairn, Southgate, Calif., assignors to North American Aviation, Inc.

Application January 24, 1949, Serial No. 72,524

10 Claims. (Cl. 74—5)

This invention pertains to a gyroscope and particularly to a gyroscope having inherent freedom from errors due to external conditions.

It is an object of this invention to provide a gyroscope which is free of errors due to accelerations.

It is another object of this invention to provide a gyroscope which is largely independent of temperature variations.

It is another object of this invention to provide a gyroscope in which the axial and radial deflection characteristics of the rotor are substantially equal.

It is a further object of this invention to provide a gyroscope which is elastically isotropic.

It is a further object of this invention to provide a precision gyroscope having high inherent accuracy.

Other objects of invention will become apparent from the following description taken in connection with the accompanying drawings, in which Fig. 1 is a perspective view of the invention;

Figure 1:
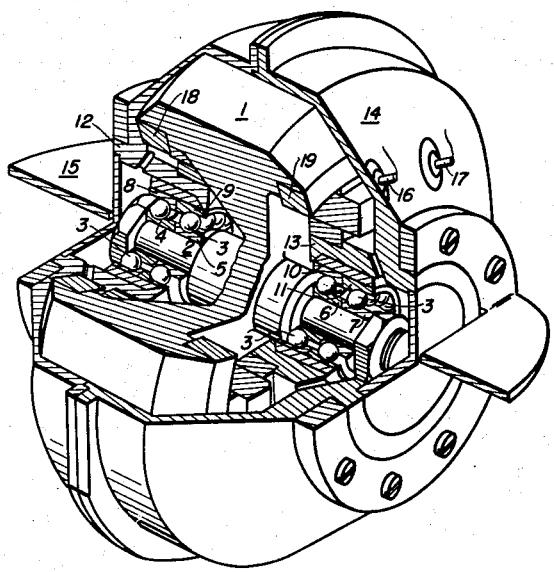

Referring to Fig. 1, rotor 1 attached to shaft 2 rotates on ball bearings 3. Bearings 3 rest in inner races 4, 5, 6, and 7 cemented to shaft 2, and in outer races 8, 9, 10, and 11 cemented to stators 12 and 13. Casing 14 is secured to stators 12 and 13 and forms a shield for the entire assembly. Mounting ring 15 connects casing 14 to the device in which the gyro is used, and terminals 16 and 17 serve to conduct electricity to stators 12 and 13 which form symmetrical halves of an electric motor along with portions 18 and 19 of rotor 1.

Referring again to Fig. 1, rotor 1 is constructed so as to be symmetrical both about the axis of rotation and about a plane normal to the rotor axis and bisecting said rotor. It can be seen that if the rotor were perfectly rigid it would not deform in response to acceleration. However, since it is elastic, some deformation necessarily occurs when the rotor is subjected to linear acceleration. If the rotor material has elastic properties which are directional in nature; i. e. if more deformation occurs in one direction than in another, the result will be that the center of gravity will shift out of the line of action of the acceleration, producing a moment or torque equal to the product of the distance of shift from the said line of action, the mass of the rotor, and the acceleration. While it can be seen that the magnitude of this quantity is almost infinitesimal, its importance in obtaining the extreme precision, which is a new result that this invention as a whole obtains, demands its consideration, and its elimination is an important object of this invention. In this connection it is to be remembered that the imposition of any torques upon the gyro rotor in directions not corresponding to the spin axis of the rotor decreases the precision attainable by the gyroscope.

Figure 2:
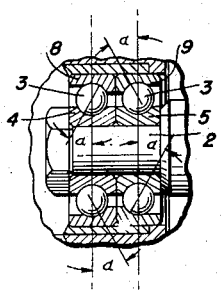
Fig. 2 is a detailed fragmentary cross-section of the invention.

Since it is thus impossible to find a material which is absolutely rigid, it became necessary to so construct the gyro as to be isoelastic; i. e. to have elastic properties which are in all directions the same. If the angle between the line produced by movement of the mass center of an object subjected to acceleration and the line of action of the acceleration be denoted the error angle, it can be seen that the optimum gyroscope will be one having a minimum error angle. This result has been achieved in the present invention by making the gyros symmetrical and by using special bearings for the gyro rotor. Referring to Fig. 1, bearing races 4, 5, 6, and 7 are cemented to shaft 2 with a phenolic or resorcinol resin in a very thin film (.0001" or less) having high bonding strength to the polished bearing and shaft, and good strength in shear, tension, and compression. Fig. 2 shows the relation between the shaft, the stator, the bearing races, and the bearings. As previously noted, the entire gyroscope, including the bearings, is symmetrical about a plane bisecting the rotor and normal to the spin axis. In Fig. 2 the bearing races have contact angles of 33 to 36 degrees, depending upon the critical dimensions of the type of bearing used, and is approximately 35 degrees. This angle makes axial and radial deflections of the bearings due to acceleration equal to each other. The contact angle is the angle $a$ between a plane normal to the axis of rotation of the bearings and a line joining the points of tangency of the bearings in the races. This angle may be varied somewhat under different design conditions, but is chosen so as to make the error angle due to the bearing deflections as nearly as possible zero. The bearings are also mounted in a fully symmetrical manner so as to keep radial and axial deflection characteristics substantially equal. The anchoring of both ends of the rotor shaft to the housing through the bearings is of extreme importance. This makes not only for geometric symmetry but for elastic symmetry as well.

Furthermore, the shape of the rotor itself was so chosen as to make the deformation due to centrifugal forces as symmetrical and uniform as possible. In this connection it must be observed that the effect of centrifugal forces, as well as of other acceleration forces, is not only to stretch and enlarge the periphery of the rotor, but also to draw in the rotor axially by an amount which is dependent upon the Poisson's ratio for the material used for the rotor and the shape of the rotor. The design of the rotor takes this factor into account by pinching in the rotor shape near the shaft and making the axis relatively short so as to minimize the actual amount of shortening which, if very large, would affect the performance of the bearings.

Design of the rotor was premised on the requirement that the radial deflection of the shaft when loaded at the center by the mass of the rotor be the same as axial deflection of the rotor disc when supported at the center and loaded by the action of gravity on its mass. Various trial shapes were found unsuccessful before the present design was found. It was finally found that by tapering the web of the rotor so as to have the least thickness next to the rotor shaft, the effect on the shaft length of the Poisson's contraction of the rotor was minimized. The least thickness of the web is limited only by the maximum allowable stresses in the thinnest region for a given rotor speed and size. Gradual tapering of the web was found to reduce the Poisson's contraction of the shaft to one-fourth of that occurring in a plain rectangular cross-section rotor and less than one-half that for a T-shaped cross-section.

Likewise, the rotor is designed so that the radial and axial effects of temperature expansion do not seriously affect the accuracy of the gyro. For example, if the housing expands at a different rate or by a different amount than the rotor, the difference is largely disposed of by the anchoring of the rotor shaft at both ends of the housing by cementing of the bearing races as described hereinbefore. Also, by making the rotor and housing of the same material, differences in coefficients of temperature expansion are eliminated. A 36 percent nickel-iron alloy, known by the trade name of "Invar" or "Nilvar" is used as a material to aid in achieving this effect.

To carry the advantages to be gained by symmetry to their logical conclusion, the motor used to drive the gyro is incorporated symmetrically into the rotor as is shown in Fig. 1. Beside the fact that it is split into two symmetrical halves, the motor is otherwise of conventional type.

When the rotor and bearings are assembled, the bearings on each end of the shaft are internally preloaded until the required contact angle is achieved. The shaft is coated with cement and the two bearings are placed on the shaft. Races 8 and 9 and 10 and 11 touch each other and the inner races 5 and 6 press against the rotor. A predetermined force, which represents the desired preload, is then applied to races 4 and 7, thus pressing the two inner races in each pair closer to each other, or into contact, and increasing the contact angle to the required value. This force is maintained constant until the cement sets, thus providing an accurate control over the amount of preload and, hence, of the magnitude of the contact angle. Analysis has indicated that a contact angle which may range from 33 to 36 degrees, depending on the type of bearing employed, will produce equal axial and radial deflections. In each bearing, therefore, the inner race is translated along the axis of the axle until the balls contact both the inner and outer races at the same desired angle. The races are then locked or cemented into position as hereinbefore described and, although subsequent axial loads on the bearings due to accelerations may produce small changes in contact angles, no play or "slop" exists in the bearings to alter the constant relation between radial and axial deflection characteristics of the assembled gyroscope. Each end of the shaft is thus internally balanced in amount of pre-load applied to the bearings and nearly uniform power consumption at both sets of bearings is achieved for loads from one to ten gravities in any direction.

Figure 3:
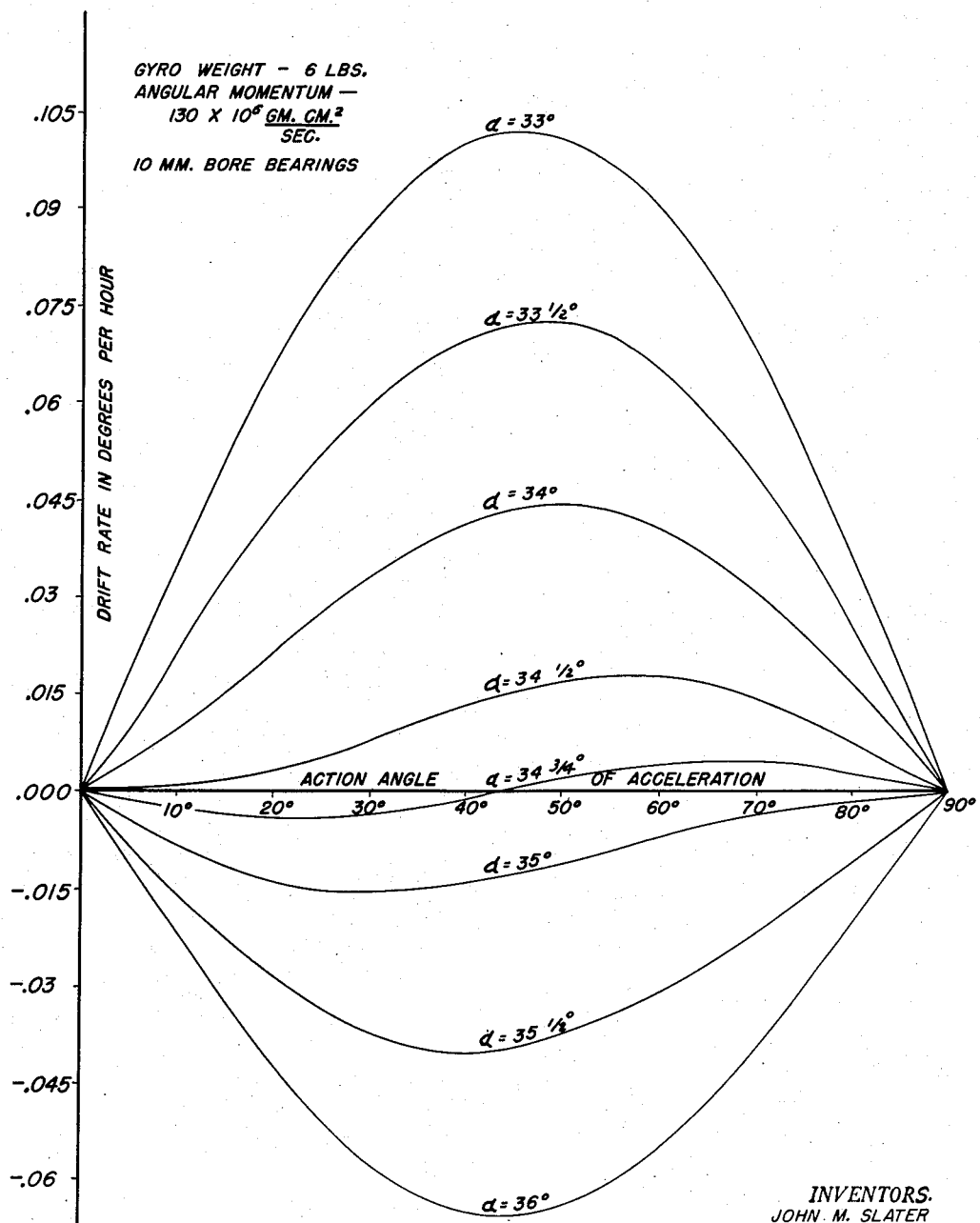
Fig. 3 is a graph of drift rate of a gyro constructed according to this invention.

Fig. 3 is a chart showing the effect on free drift rate, at $1g$, of one particular gyro rotor (weight 3 kgm., angular momentum $130 \times 10^6$ gm.-cm.$^2$-sec.$^{-1}$) of rotor mass shift, with one type of rotor bearing for different contact angles. These curves apply to a standard angular contact type duplex ball bearing with a 15-pound preload; internal characteristics: 7 balls, ¼" diameter, inner race curvature 0.51, outer race curvature 0.53; 10 mm. bore.

In the chart the angular relation of the rotor to the disturbing acceleration ($1g$ in this example) is shown as abscissa, the 45° point being that at which $g$ acts along a line bisecting the right angle between the spin and precession axes. The resulting free drift rate of the gyro due to the disturbing moment is shown as the ordinates.

All the curves, corresponding to bearings of different angles, come to zero at the 0 and 90° positions (pure radial or thrust loads), but only one curve—that corresponding to a critical contact angle of 34.75 degrees—come to zero at the 45° position, and only this curve is at all times of small value. That is, use of bearings of this particular contact angle means that gyro drift due to unsymmetrical mass shift is substantially eliminated, or at least made negligible, whereas an appreciable error can result if the contact angle is increased or decreased by more than a small amount. While there is no sharply defined limit for the tolerance in contact angle, for most practical purposes the contact angle has to be within plus or minus 1 or 2 degrees of the optimum value to obtain the full benefits of the invention. This tolerance is much closer than those held on contact angle in conventional ball bearing manufacturing methods.

There is thus provided a gyroscope which embodies entirely new principles of construction; i. e., isoelastic bearing and rotor and housing design, minimization of Poisson's contraction of the shaft, and substantial elimination of volume change due to temperature variation. The gyroscope can be used under conditions where it is subjected to severe linear accelerations without affecting its accuracy because deformation of the rotating parts occurs so that the mass center moves in substantially the same direction as the acceleration producing the movement.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A gyroscope comprising a rotor bilaterally symmetrical about a plane normal to its axis of rotation, bearing means at each end of said rotor having radial and axial deflection characteristics which are substantially equal, a symmetrical housing for said rotor, and motive means for said rotor symmetrically disposed in said housing.

2. A gyroscope comprising a rotor having isometric elastic characteristics, and elastic bearing means having substantially equal axial and radial deflection characteristics whereby gyroscope errors due to linear accelerations are substantially reduced.

3. In a gyroscope a rotor, a stator, and elastic bearing means for rotatably supporting the rotor in the stator, the bearing means characterized by having substantially the same deflection, under unit load, in all directions in a plane which includes the rotation axis.

4. A gyroscope comprising a rotor having a symmetrical cross-section decreased in thickness near the center thereof, an axle of predetermined length, and bearing means having radial and axial deflection characteristics which are substantially equal whereby Poisson's contraction of said axle is minimized and errors due to linear acceleration of said gyroscope are eliminated.

5. A bearing adapted to carry a rotating member on a stationary member comprising two inner races attached to one of said members, two outer races attached to the other of said members, spherical balls adapted to ride in said races, and means for holding said races in preloaded arrangement to thereby cause said balls to ride said races at a contact angle of 33° to 36°, causing axial displacement to bear a fixed, controllable ratio to radial deflection.

6. In a gyroscope, a rotor symmetrical about a plane normal to its axis of rotation and reduced in thickness at its center, a stator having bearing races integrally attached thereto, a shaft for supporting said rotor, ball bearings adapted to run in said races, and races on said shaft operatively positioned so that said ball bearings make contact angles with said races to equalize the radial and axial deflection characteristics of said gyroscope.

7. The method of assembling angular contact type duplex ball bearings on a bearing shaft comprising covering the shaft with a thin coating of fluid bonding material, fitting the individual assembled bearings on the shaft with the outer races contacting each other but the inner races just short of contact, and squeezing the inner races together with predetermined force to thereby secure a predetermined bearing contact angle and a predetermined ratio of axial and radial stiffness of the bearings.

8. The method of assembling angular contact type duplex ball bearings on a bearing shaft for equal axial and radial stiffness comprising covering the shaft with a thin coating of fluid bonding material, fitting the individual assembled bearings on the shaft with the outer races contacting each other but the inner races just short of contact, squeezing the inner races together with predetermined force and allowing said bonding material to set to thereby secure a bearing contact angle of from 33 to 36 degrees, giving equal axial and radial stiffness to the bearing.

9. A gyroscope comprising a housing of material having low coefficient of temperature expansion, a rotor of the same material as said housing having an enlarged rim and a web decreasing in thickness toward the center thereof, a shaft for supporting said rotor, and ball bearing means on each end of said shaft having predetermined contact angles with races anchored to said shaft and said housing, said contact angles being of a critical value to cause said bearings to have substantially equal radial and axial deflection characteristics whereby the characteristics of said gyroscope remain the same despite temperature change, accelerations, and Poisson contraction of said motor.

10. A gyroscope comprising a rotor having symmetrical cross section and decreased thickness near the center thereof, an axle of predetermined length, a stator having fixed ball bearing races, ball bearings adapted to run in said races, and races on said axle adapted to preload said bearings at a critical contact angle, said angle being of a value which causes the deflection characteristics of said bearings to be substantially isoelastic, whereby Poisson's contraction of said axle is minimized and gyroscope errors due to linear acceleration of said gyroscope are materially reduced.

JOHN M. SLATER.
ROBERT M. BENSON.
DARWIN L. FREEBAIRN.

References Cited in the file of this patent

UNITED STATES PATENTS

| Number | Name | Date |
| --- | --- | --- |
| 881,471 | Hoffman | Mar. 10, 1908 |
| 1,077,344 | Hennig | Nov. 4, 1913 |
| 1,279,471 | Sperry | Sept. 17, 1918 |
| 1,722,492 | Brunner | July 30, 1929 |
| 2,157,101 | Smith | May 9, 1939 |
| 2,199,024 | Carter et al. | Apr. 30, 1940 |
| 2,244,603 | Bauer | June 3, 1941 |
| 2,449,944 | Johnson | Sept. 21, 1948 |
| 2,474,072 | Stoner | June 21, 1949 |

FOREIGN PATENTS

| Number | Country | Date |
| --- | --- | --- |
| 251,389 | Great Britain | May 6, 1926 |